C. RATCLIFF.
Nut Machine.
No. 16,188.
Patented Dec. 9, 1856.
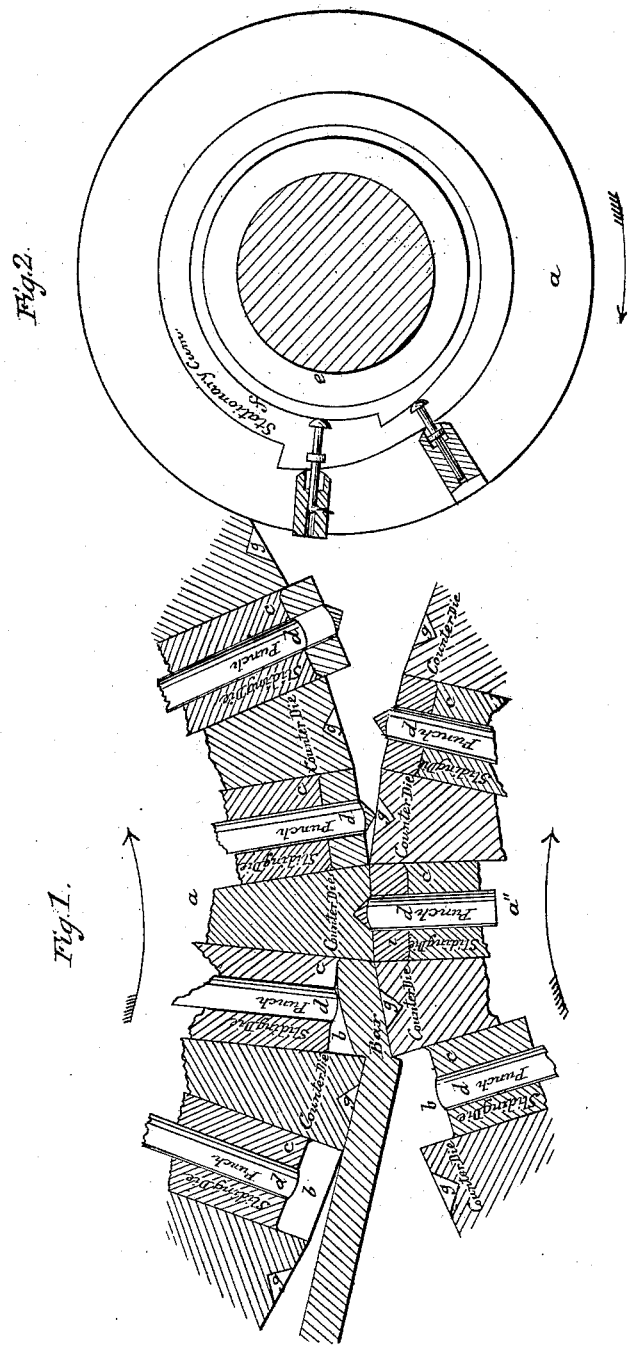

UNITED STATES PATENT OFFICE.

CHARLES RATCLIFF, OF CINCINNATI, OHIO.

NUT-MACHINE.

Specification of Letters Patent No. 16,188, dated December 9, 1856.

*To all whom it may concern:*

Be it known that I, CHARLES RATCLIFF, of Cincinnati, in the county of Hamilton and State of Ohio, have invented new and useful Machinery for Making Metallic Nuts and Washers; and I hereby declare the following to be a full, clear, and exact description thereof, reference being had to the annexed drawings, making part of this specification.

The object of my invention is to provide a machine capable of manufacturing nuts, washers, &c., with greater rapidity and at a less cost than has been possible with machines hitherto employed; the object being accomplished by two series of dies and counter dies arranged alternatingly in the peripheries of a pair of rolls, so that a bar of iron at welding heat being fed in between the rolls is converted into nuts or washers as the case may be, by the continuous rotation of the rolls.

In the accompanying drawings Figure 1 shows by transverse section a small portion of each roll with its contained dies, &c. Fig. 2 is a diagram representing the action of the stationary cams upon the sliding dies and punches.

($a$, $a''$,) are two "rolls" of large diameter (not less than three feet for an inch nut). In the peripheries of these rolls are sunk boxes ($b$) of form and dimensions corresponding with those desired for the nuts. Within these boxes fit and work pistons ($c$) called by me the "dies". These dies are employed to form the bottoms of the nuts, and in their normal position stand the thickness of a nut below the periphery of the roll. Within these dies again there work round punches ($d$) to form the eye of the nut. Both die and punch are worked by means of stationary cams ($e$. $f$.). The surface of the peripheries between the boxes forms the "counter-dies". The faces of these counter dies have counter-sunk cavities ($g$) at their middle.

The action is as follows. The "rolls" being rotated in direction of the arrows and the end of a heated bar inserted, a portion suitable for a nut will be cut off as at (1) Fig. 1; then as the rolls revolve, the punch ($d$) being forced outward by the stationary cam ($e$) forms the eye, the portion or residue of the waste or punching not squeezed into the body of the nut being received and held by the cavity ($g$). The nut being formed is expelled at a suitable part of the revolution by the moving outward of the sliding die ($c$) an action which is effected by the stationary cam $f$.

The end of the bar may be guided to its proper insertion by means of a flaming tubular guide. The punch may be retracted by means of a strong spring.

I do not claim any peculiarity in the manner of punching, nor in the operation of the dies separately considered but,

What I claim as new and of my invention herein is—

The two sets of dies, counter-dies and punches arranged alternately upon the peripheries of a pair of rolls substantially as above set forth.

In testimony whereof, I hereunto set my hand before two subscribing witnesses.

C. RATCLIFF

Witnesses:
JAMES H. GRIDLEY,
GEO. H. KNIGHT.